US012027803B2

(12) United States Patent
Poh et al.

(10) Patent No.: US 12,027,803 B2
(45) Date of Patent: *Jul. 2, 2024

(54) KEYED INPUT/OUTPUT CONNECTOR

(71) Applicant: Molex, LLC, Lisle, IL (US)

(72) Inventors: Edmund Poh, Lisle, IL (US); Philip Dambach, Naperville, IL (US); Lie Chen, Maumelle, AR (US); Marie Poff Cain, Maumelle, AR (US); David L. Brunker, Naperville, IL (US); Alexandra Haser, Downers Grove, IL (US); Egide Murisa, Little Rock, AR (US); Huadong Li, Naperville, IL (US); Scott D. Sommers, Naperville, IL (US)

(73) Assignee: Molex, LLC

( * ) Notice: Subject to any disclaimer, the term of this patent is extended or adjusted under 35 U.S.C. 154(b) by 0 days.

This patent is subject to a terminal disclaimer.

(21) Appl. No.: 18/237,422

(22) Filed: Aug. 24, 2023

(65) Prior Publication Data

US 2023/0396024 A1 Dec. 7, 2023

Related U.S. Application Data

(63) Continuation of application No. 18/105,235, filed on Feb. 2, 2023, now Pat. No. 11,784,440, which is a (Continued)

(51) Int. Cl.

| | |
|---|---|
| ***H01R 13/6582*** | (2011.01) |
| ***H01R 12/71*** | (2011.01) |

(Continued)

(52) U.S. Cl.

CPC ......... *H01R 13/6582* (2013.01); *H01R 12/71* (2013.01); *H01R 13/502* (2013.01); *H01R 13/514* (2013.01); *H01R 13/6594* (2013.01)

(58) Field of Classification Search

CPC .............. H01R 13/6582; H01R 13/502; H01R 13/514; H01R 13/6594; H01R 12/71

See application file for complete search history.

(56) References Cited

U.S. PATENT DOCUMENTS 5,013,262 A * 5/1991 Shibano ............... H01R 13/658 439/353
D464,631 S * 10/2002 Billman ....................... D13/184

(Continued)

FOREIGN PATENT DOCUMENTS

CN 1245986 A 3/2000
CN 101330173 A 12/2008

(Continued)

OTHER PUBLICATIONS

International Preliminary Report received for PCT Application No. PCT/US2018/062053, mailed on Jun. 4, 2020, 09 Pages.

(Continued)

*Primary Examiner* — Abdullah A Riyami
*Assistant Examiner* — Nader J Alhawamdeh

(57) ABSTRACT

A cage includes a cage housing forming an inner area with internal walls that define an upper port and a lower port. Each of the ports include a cap that forms a keyway. The cap in an upper bay can extend from the upper bay in a direction that is opposite a direction the cap in the lower port extends. The cage may include a plurality of spring fingers therein which engage with a conductive bezel. The cage provides EMI shielding for the plug connector.

20 Claims, 7 Drawing Sheets

Related U.S. Application Data continuation of application No. 17/521,856, filed on Nov. 9, 2021, now Pat. No. 11,575,230, which is a continuation of application No. 16/764,884, filed as application No. PCT/US2018/062053 on Nov. 20, 2018, now Pat. No. 11,201,436.

(60) Provisional application No. 62/633,819, filed on Feb. 22, 2018, provisional application No. 62/589,327, filed on Nov. 21, 2017.

(51) Int. Cl.

| | |
|---|---|
| ***H01R 13/502*** | (2006.01) |
| ***H01R 13/514*** | (2006.01) |
| ***H01R 13/6594*** | (2011.01) |

(56) References Cited

U.S. PATENT DOCUMENTS

| | | | | |
|---|---|---|---|---|
| D468,269 | S * | 1/2003 | Hwang | D13/154 |
| D468,270 | S * | 1/2003 | Hwang | D13/154 |
| D468,698 | S * | 1/2003 | Hwang | D13/154 |
| D481,677 | S * | 11/2003 | Hwang | D13/123 |
| D491,525 | S * | 6/2004 | Hwang | D13/133 |
| D507,228 | S * | 7/2005 | Matthies | D12/223 |
| 7,438,596 | B2 | 10/2008 | Phillips | |
| 7,727,018 | B2 * | 6/2010 | Bright | H01R 13/6584 439/607.28 |
| 8,342,881 | B2 * | 1/2013 | Lang | H01R 24/00 439/607.01 |
| 9,065,230 | B2 | 6/2015 | Milbrand, Jr. | |
| 9,287,640 | B2 * | 3/2016 | Hirschy | H01R 12/585 |
| 9,716,347 | B2 * | 7/2017 | Kachlic | H01R 13/6581 |
| D817,520 | S * | 5/2018 | Gonzales | D25/126 |
| D840,343 | S * | 2/2019 | Chen | D13/133 |
| D840,344 | S * | 2/2019 | Chen | D13/133 |
| D840,345 | S * | 2/2019 | Chen | D13/133 |
| D853,332 | S * | 7/2019 | Chen | D13/133 |
| 2003/0096528 | A1 * | 5/2003 | Fukamachi | H01R 13/6456 439/378 |
| 2004/0185696 | A1 * | 9/2004 | Long | H05K 9/0058 439/160 |
| 2007/0066137 | A1 * | 3/2007 | Yang | H01R 43/18 439/607.01 |
| 2008/0285236 | A1 * | 11/2008 | Phillips | H01R 13/659 361/709 |
| 2009/0124127 | A1 * | 5/2009 | Zhang | H01R 13/6582 439/607.38 |
| 2010/0079971 | A1 * | 4/2010 | Gillespie | H01R 13/658 361/816 |
| 2011/0306253 | A1 * | 12/2011 | Kumamoto | H01R 13/648 439/892 |
| 2012/0058670 | A1 | 3/2012 | Regnier et al. | |
| 2012/0190224 | A1 * | 7/2012 | Wu | H01R 13/633 439/157 |
| 2013/0065454 | A1 * | 3/2013 | Milbrand, Jr. | H01R 12/7005 439/676 |
| 2013/0115800 | A1 * | 5/2013 | Chan | H01R 43/20 439/372 |
| 2014/0235091 | A1 * | 8/2014 | Wang | H01R 13/6275 439/352 |
| 2015/0171545 | A1 * | 6/2015 | Yu | H01R 13/11 439/485 |
| 2015/0180168 | A1 * | 6/2015 | Han | H01R 13/6581 439/353 |
| 2015/0200495 | A1 * | 7/2015 | Yu | H05K 9/0058 439/607.55 |
| 2016/0211624 | A1 | 7/2016 | Long | |
| 2016/0322758 | A1 * | 11/2016 | Wan | H01R 13/6581 |
| 2017/0054234 | A1 * | 2/2017 | Kachlic | H01R 13/6583 |
| 2017/0222379 | A1 * | 8/2017 | Leigh | H01R 29/00 |
| 2018/0166827 | A1 * | 6/2018 | Little | H01R 13/6335 |

FOREIGN PATENT DOCUMENTS

| | | | |
|---|---|---|---|
| CN | 201387949 | Y | 1/2010 |
| CN | 101944686 | A | 1/2011 |
| CN | 204793438 | U | 11/2015 |
| JP | H0313682 | U | 2/1991 |
| JP | 2001015217 | A | 1/2001 |
| JP | 2004354866 | A | 12/2004 |
| TW | 201526408 | A | 7/2015 |
| TW | 201607160 | A | 2/2016 |
| TW | M583631 | U | 9/2019 |
| WO | 2014079978 | A1 | 5/2014 |
| WO | 2019104059 | A1 | 5/2019 |

OTHER PUBLICATIONS

International Search report and written opinion received for PCT application No. PCT/US2018/062053, mailed on Mar. 11, 2019, 10 pages.

Non Final Rejection mailed on U.S. Appl. No. 16/764,884, mailed on Apr. 16, 2021, 17 Pages.

Notice of allowance received for U.S. Appl. No. 18/105,235 mailed on May 23, 2023, 11 pages.

Notice of allowance received for U.S. Appl. No. 29/627,174, mailed on Sep. 26, 2018, 9 pages.

Notice of allowance received for U.S. Appl. No. 29/627,177, mailed on Sep. 27, 2018, 9 pages.

Notice of allowance received for U.S. Appl. No. 29/627,178, mailed on Sep. 28, 2018, 9 pages.

Notice of allowance received for U.S. Appl. No. 29/627,172, mailed on Mar. 6, 2019, 8 pages.

Notice of Allowance received for U.S. Appl. No. 17/521,856, mailed on Oct. 5, 2022, 11 pages.

Restriction requirement received for U.S. Appl. No. 29/627,172, mailed on Oct. 9, 2018, 6 pages.

* cited by examiner

KEYED INPUT/OUTPUT CONNECTOR

RELATED APPLICATIONS

This application is a continuation of the U.S. application Ser. No. 18/105,235, filed on Feb. 2, 2023 which is a continuation of the U.S. application Ser. No. 17/521,856, filed Nov. 9, 2021, now U.S. Pat. No. 11,575,230, which is a continuation of the U.S. application Ser. No. 16/764,884, filed May 18, 2020, now U.S. Pat. No. 11,201,436, which is incorporated herein by reference in its entirety and which claims priority to International Application No. PCT/US18/62053, filed Nov. 20, 2018, which in turn claims priority to U.S. Provisional Application No. 62/589,327, filed on Nov. 21, 2017, and 62/633,819, filed on Feb. 22, 2018, the contents of which are incorporated herein in their entirety.

TECHNICAL FIELD

This disclosure relates to the field of input/output (IO) connectors, more specifically to I/O connectors suitable for use in high data rate applications.

DESCRIPTION OF RELATED ART

Input/output (IO) connectors are commonly used in applications where high bandwidth is desired. For example, small form factor pluggable (SFP) style connectors were originally developed to provide a transmit and a receive channel (e.g., to prove what is known as a 1× connector) and gradually the performance of SFP connectors has increased so that they can support 16 Gbps and even 25+ Gbps channels. A 1× connector was quickly determined to be insufficient for certain needs and quad small form factor pluggable (QSFP) style connectors were developed to provide more channels and act as a 4× connector.

While larger sizes of connectors have been developed increased density is still required. In order to accomplish this, a second row of channels is added to the current configurations, this type of (I/O) are commonly known as double density and can applied to the original or legacy form factors of SFP (SFP-DD) and QSFP (QSFP-DD) therefore doubling the density of channels. Certain individuals, however, would appreciate further improvements to the design of such pluggable connectors.

In order to support elevated signaling speeds such as 16 Gbps and even 25+ Gbps within individual channels, effective module and cage shielding systems are required to minimize the opportunity for electromagnetic interference (EMI) to occur. The module and cage shielding system is employed to minimize EMI by containing active circuitry and contact systems within a substantially enclosed conductive module that typically supports copper or optical cable termination, containment for a range of circuitry that could include amplification, retiming, selective filtering, EO/OE conversion and other similar functions. Circuitry operating at these elevated transmission speeds is considered very energetic and capable of generating EMI.

SUMMARY

An assembly including a plug connector and a conductive cage. The plug connector includes a housing, a projection extending therefrom, and a paddle card mounted therein. The cage includes a cage housing forming an inner area and at least one cap forming a keyway. The keyway is generally formed as a channel having three distinct sides. The housing of the plug connector is received in the inner area of the cage and the projection of the plug connector is received in the keyway of the cage. The cage may include a plurality of spring fingers therein which engage with a conductive bezel. The cage provides EMI shielding for the plug connector.

BRIEF DESCRIPTION OF THE DRAWINGS

The present invention is illustrated by way of example and not limited in the accompanying figures in which like reference numerals indicate similar elements and in which.

DETAILED DESCRIPTION

The detailed description that follows describes exemplary embodiments and the features disclosed are not intended to be limited to the expressly disclosed combination(s). Therefore, unless otherwise noted, features disclosed herein may be combined together to form additional combinations that were not otherwise shown for purposes of brevity.

One embodiment to minimize such electromagnetic radiation is an input/output connector which includes a conductive cage 20 into which a shielded module or plug connector 22 is inserted, wherein the shielded conductive plug connector 22 forms a primary electromagnetic containment and the cage 20 forms a conductive sleeve around the shielded plug connector 22. The cage 20 and the plug connector 22 form a telescoping assembly that can contain a mating connector (not shown) toward the distal extent of the telescoping section. In this manner, any exposed contacts can be recessed substantially within the telescoping structure. The largest transverse gap formed between the shielded plug connector 22 and the surrounding conductive cage 20 establishes a waveguide aperture that has an associated filtering capability when operated at a frequency below cutoff. When the recess of the telescoping section is formed by the plug connector 22 being installed within the conductive cage 20, length is added to the transverse gap in the direction of installation. Waveguide length plus the limiting transverse gap combine to form an electromagnetic interference (EMI) filter when operated below cutoff. This establishes enhanced high-speed performance by maintaining the integrity of plug connector containment and the formation of an effective waveguide filter established by the telescoping action of the plug connector 22 within the conductive cage 20.

Legacy SFP+ cable solutions have been widely used as a connection solution for digital world for years. There is a need from the field for double or even multiple times the quantity of channels to provide more connections utilizing the same form factor of legacy SFP. In this way, customers are able to leverage existing systems with existing form factors a new level of capability. With the increase in demand for greater bandwidth, the solution for SFP and the sort is a double density (DD) solution which can double the overall bandwidth with same form factor by adding multiple rows of channels to the existing legacy framework. It allows a legacy SFP+ module to work with an SFP-DD connector and the cage 20.

Figure 1:
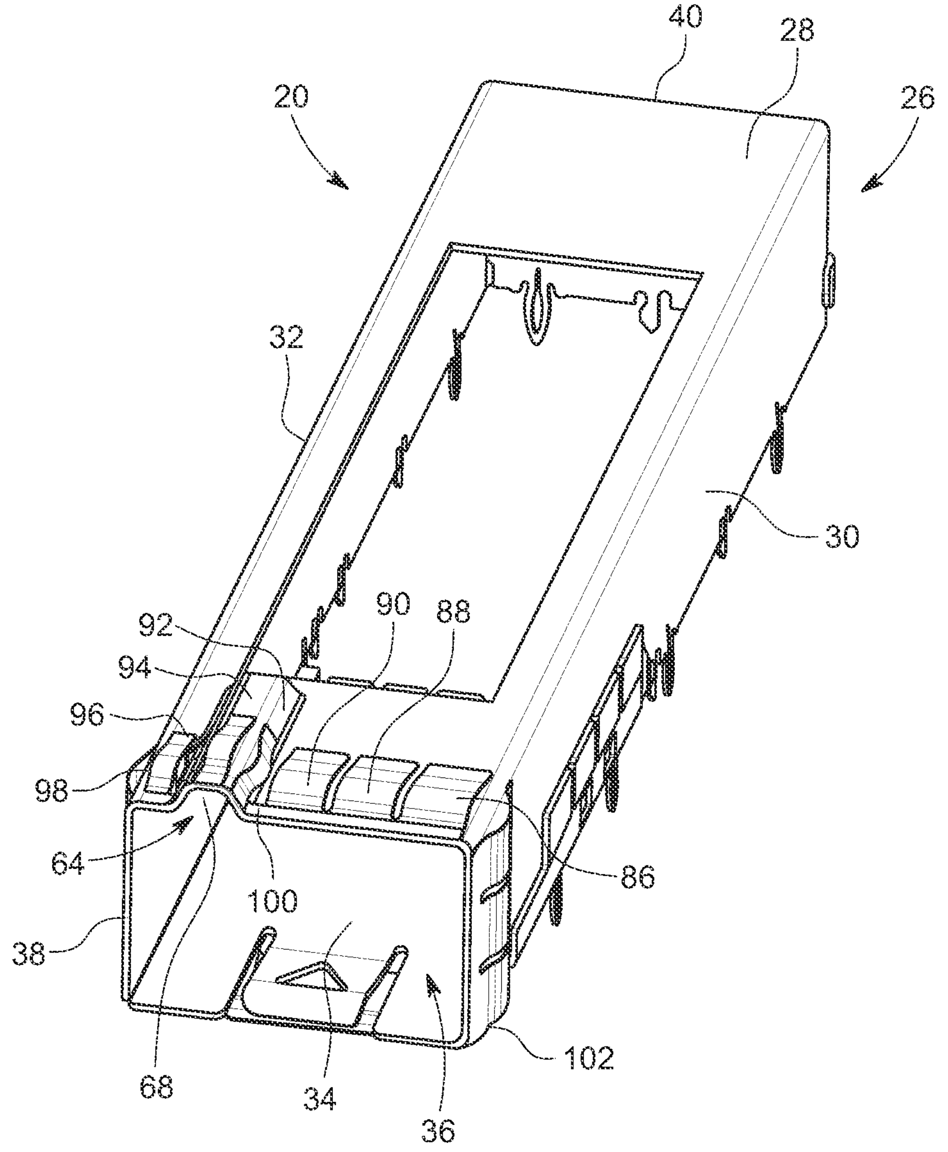
FIG. 1 is a perspective view of an embodiment of a cage which forms part of an input/output connector.
Figure 3:
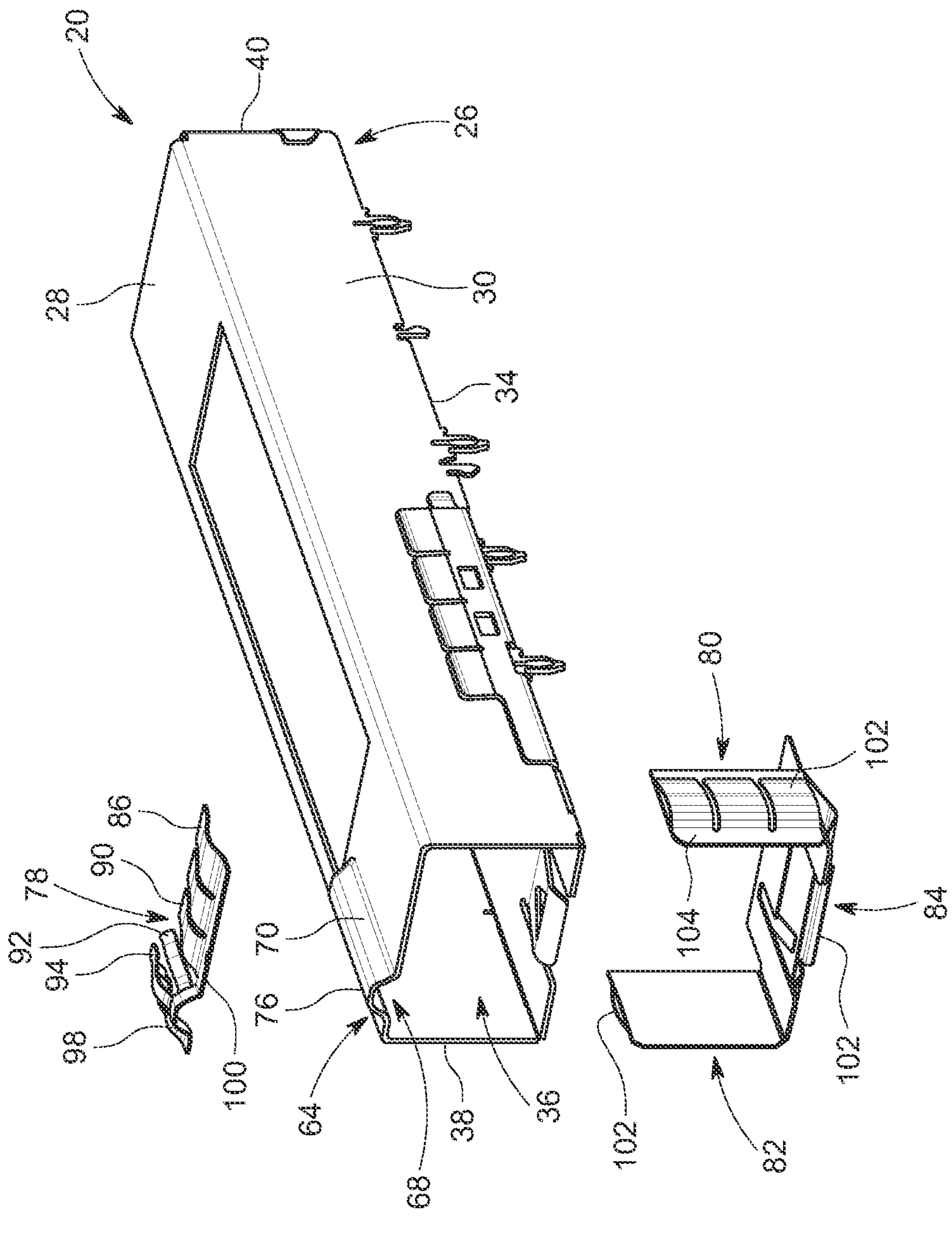
FIG. 3 is an exploded perspective view of the cage.
Figure 4:
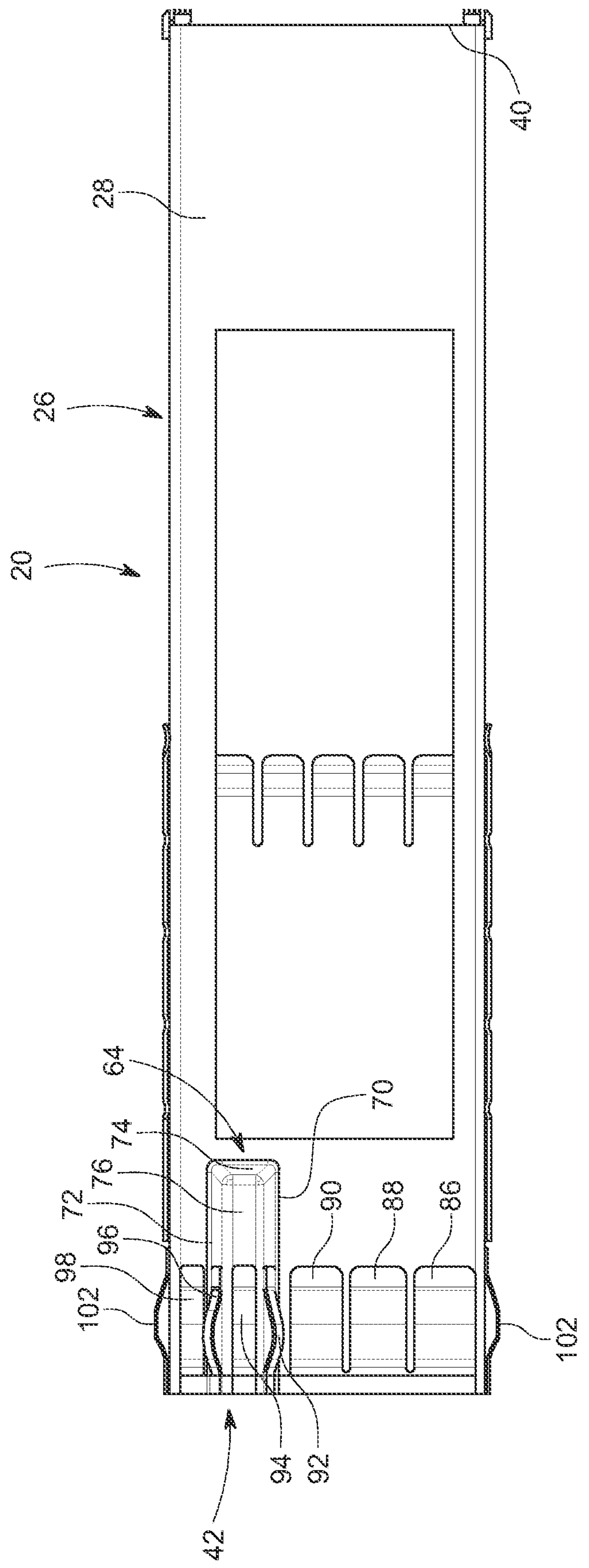
FIG. 4 is a top plan view of the cage.

As shown in FIGS. 1, 3 and 4, the cage 20 includes a cage housing 26 having a top wall 28, side walls 30, 32 depending downwardly from the top wall 28, and a bottom wall 34 connected to bottom ends of the side walls 30, 32. The walls 28, 30, 32, 34 form an inner area 36 that is accessed through a front opening 38 which defines a mating end 42 at the front of the cage housing 26. A rear end 40 of the cage housing 26 is opposite to the front opening 38. A length of the cage housing 26 is defined between the front opening 38 and the rear end 40 of the cage housing. The cage housing 26 may rest on a printed circuit board (not shown). The cage 20 may be formed by stamping and forming.

Figure 2:
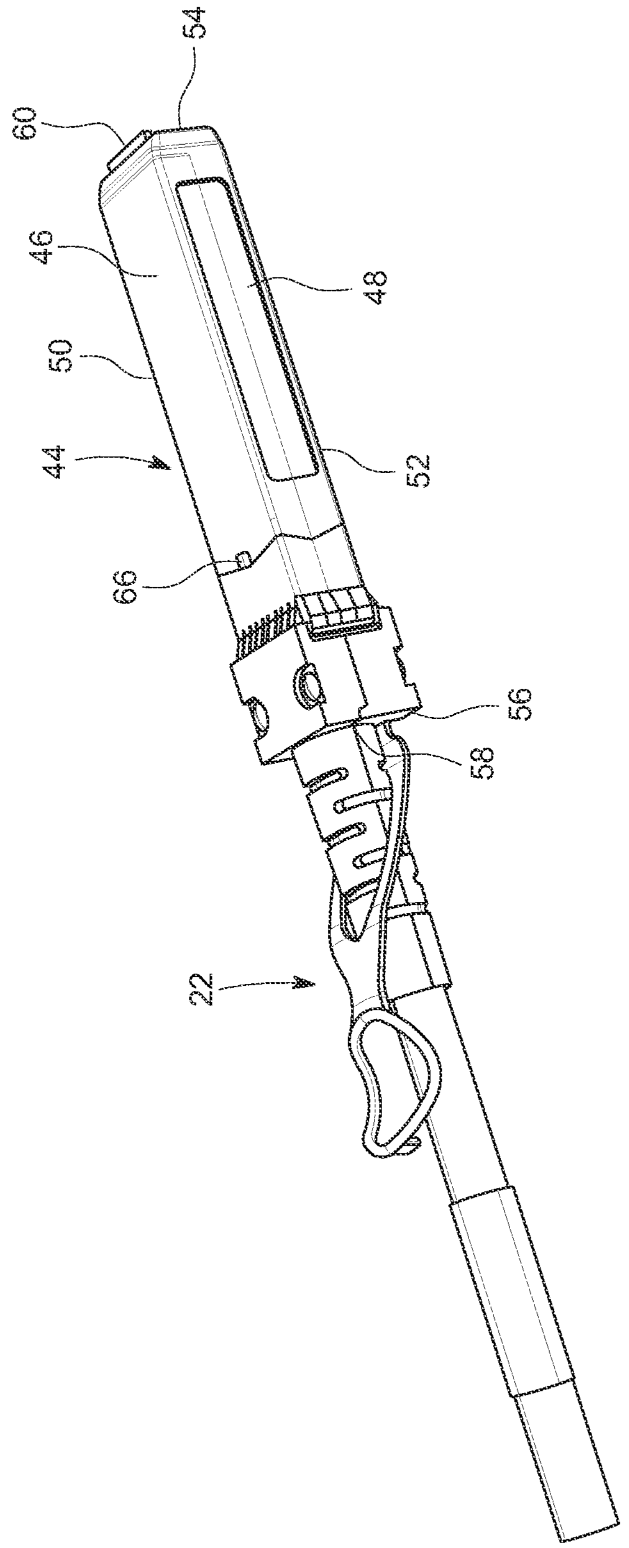
FIG. 2 is a perspective view of an embodiment of a plug connector which forms part of the input/output connector.

As shown in FIG. 2, the plug connector 22 includes a housing 44 having a top wall 46, side walls 48, 50 depending downwardly from the top wall 46, and a bottom wall 52 connected to bottom ends of the side walls 48, 50. The housing 44 defines a front face 54 and an opposite rear face 56. The rear face 56 defines a cable entrance 58. The housing 44 can be formed in a variety of ways, such as, but not limited to, die casting, forming and/or machining. The housing 44 of the plug connector 22 is shaped to seat within the inner area 36 of the cage housing 26 of the cage 20 so that the plug connector 22 can mate with the mating connector within the cage 20. A paddle card 60 is positioned between the top and bottom walls 46, 52, and can be offset toward the bottom wall 52. The paddle card 60 extends forward of the front face 54. In a double density configuration, the paddle card 60 includes two rows of contact pads positioned adjacent each other along a mating direction. One or more flanges can extend forward from the front face 54 and can help provide protection for the paddle card 60.

In an embodiment, the mating connector (not shown) includes a plurality of wafers arranged in a side-by-side arrangement and supported by an insulative frame. The frame of the mating connector is shaped to seat within the inner area 36 of the cage housing 26 of the cage 20 so that the plug connector 22 can mate with the mating connector within the cage 20. The wafers include two rows of terminals spaced along the mating direction each of which engage respective contact pads formed on the paddle card. Each row of contacts includes terminals that engage contact pads on a top and bottom side of the paddle card.

The cage 20 and the plug connector 22 include a keying system which ensures proper orientation of the plug connector 22 when the plug connector 22 is inserted into the cage 20. The keying system includes at least one cap 64 integrally formed with the top wall 28 of the cage housing 26 of the cage 20 such that the cap 64 forms part of the cage housing 26, and at least one raised projection 66 extending from the top wall 46 of the housing 44 of the plug connector 22 normal to the mating direction of the plug connector 22 into the cage 20.

The cap 64 extends upwardly from the top wall 28 of the housing 44 and forms a keyway 68 therein which extends from the mating end 42 rearwardly. The keyway is generally formed as a channel having three distinct sides. The sides a preferably flat but curved sides are also contemplated. The keyway 68 is open to the inner area 36 such that the inner area 36 and the keyway 68 are in communication with each other. The cap 64 is formed from a first side wall 70, a second side wall 72 which is spaced apart from the first side wall 70, an end wall 74 at rear ends of the side walls 70, 72, and an upper wall 76 at upper ends of the walls 70, 72, 74. The walls 70, 72, 74, 76 form the keyway 68 which extends from the mating end 42 of the housing 44 rearwardly. The first side wall 70 has a lower end connected to the top wall 28 and projects upwardly from the top wall 28 to the upper end. A front end of the first side wall 70 is at the mating end 42 of the housing 44 and the rear end is rearwardly of the front end. The second side wall 72 has a lower end connected to the top wall 28 and projects upwardly from the top wall 28 to the upper end. A front end of the second side wall 72 is at the mating end 42 of the housing 44 and the rear end is rearwardly of the front end. In an embodiment, the rear ends are aligned with each other. The end wall 74 has a lower end connected to the top wall 28 and projects upwardly from the top wall 28 to the upper end. The upper wall 76 extends between the upper ends of the walls 70, 72, 74 such that the upper wall 76 is spaced from the top wall 28. In an embodiment, each wall 70, 72, 74, 76 is planar.

As described herein, the cap 64 is integrally formed with the top wall 28, however, in an embodiment, the cap 64 is separately formed from the cage housing 26 and the top wall 28 has an elongated slot (not shown) formed therethrough over which the cap 64 is positioned; the cap 64 being permanently attached to the top wall 28, for example by welding so that, in effect, the cap 64 becomes integral with the cage housing 26.

Figure 5:
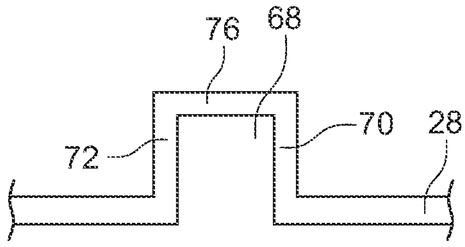
FIGS. 5-9 are end elevation views which show various shapes of a cap of the cage.
Figure 6:
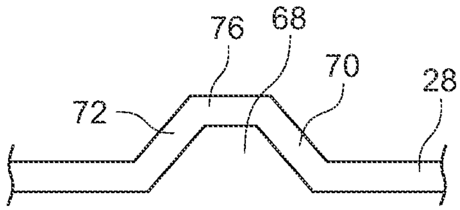
Figure 7:
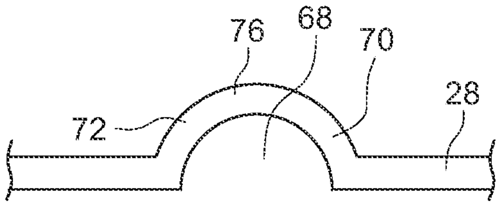
Figure 8:
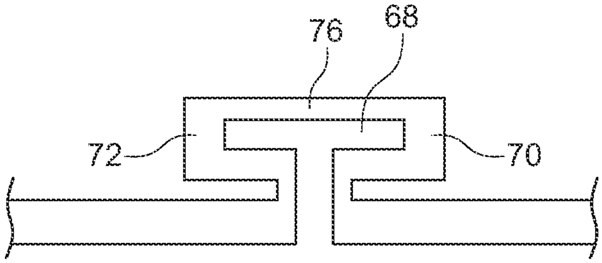
Figure 9:
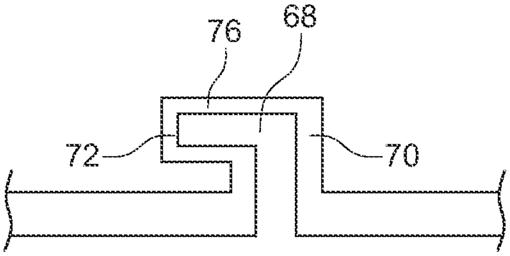

As previously stated, the cross-sectional shape of the keyway 68 is generally three-sided when viewed from the mating end 42 but may take a variety of shapes. In an embodiment, as shown in FIGS. 5 and 6, the keyway 68 when viewed from the mating end 42 is a quadrilateral, such as a rectangle. As shown in FIG. 5, the top wall 28 and the upper wall 76 are parallel to each other and the side walls 70, 72 are perpendicular to the top wall 28 and the upper wall 76, such that the cross-sectional shape of the keyway 68 is rectangular when viewed from the mating end 42. As shown in FIG. 6, the top wall 28 and the upper wall 76 are parallel to each other and the side walls 70, 72 are angled relative to the top wall 28 and to the upper wall 76 and angle inwardly toward each other, such that the cross-sectional shape of the keyway 68 is a non-regular three-sided section when viewed from the mating end 42. In this embodiment, the sides are shown with the same inward angle but sides having different angles and different combinations of angles are contemplated. In another instance, only one side may be angle and the other side is perpendicular to the tope wall and the upper wall. In an embodiment, as shown in FIG. 7, the walls 70, 72, 76 can be arranged so as to form an arcuate shape, when the cross-sectional shape of the keyway 68 is viewed from the mating end 42. In this instance, the keyway may be defined by a single wall. In an embodiment, as shown in FIG. 8, the walls 70, 72, 76 can be arranged so as to form a “T” shape, when the cross-sectional shape of the keyway 68 is viewed from the mating end 42. In an embodiment, as shown in FIG. 9, the walls 70, 72, 76 can be arranged so as to form inverted “L” shape, when the cross-sectional shape of the keyway 68 is viewed from the mating end 42. While some shapes of the keyway 68 are described herein, other shapes are within the scope of the present disclosure. The channel portion that defines the shape of the keyway may be defined by a plurality of walls. For example, a triangular keyway is defined by two walls, 4 or more walls may define cross-sections of a variety of shapes.

In an embodiment, the cap 64 extends along a portion of the length of the cage housing 26 such that the end wall 74 is spaced from the rear end 40 of the cage housing 26 as shown in FIG. 4. In an embodiment, the cap 64 extends along the entire length of the cage housing 26 such that the end wall 74 is at the rear end 40 of the cage housing 26.

As shown, the cap 64 forming the keyway 68 is positioned laterally to one side of the midpoint of the top wall 28. The cap 64 may be positioned at the midpoint of the top wall 28, or may be positioned laterally to the other side of the midpoint of the top wall 28. Alternatively, a plurality of caps 64 forming keyways 68 may be provided in the top wall 28. If a plurality of caps 64 forming keyways 68 are provided, the keyways 68 may have different cross-sectional shapes.

The projection 66 extends from the top wall 46 of the housing 44 of the plug connector 22 at a distance rearward of the front face 54. The projection 66 has a shape which corresponds to the keyway 68 into which the projection 66 will be inserted and is positioned on the top wall 46 in a position which corresponds to the keyway 68 into which the projection 66 will be inserted. With this arrangement, proper orientation of the plug connector 22 is maintained so that the plug connector 22 can be properly connected to the mating receptacle. If more than one keyway 68 is provided, then more than one projection 66 is provided and the respective projection 66 corresponds in shape to the respective keyway 68.

The plug connector 22 is inserted into the cage 20 through the front opening 38. When the plug connector 22 is properly oriented for insertion into the cage 20, the projection 66 aligns with the keyway 68 (or multiple projections 66 align with multiple keyways 68 if provided). As the plug connector 22 is inserted into the inner area 36 of the cage 20, the projection(s) 66 slide along the keyway(s) 68. The keyway 68 provides a path that properly aligns the plug connector 22 to the cage 20 to ensure proper mating. The plug connector 22 connects to the mating receptacle within the cage 20.

The projection 66 and keyway 68 provides a mistake-proof keying solution for improperly inserted SFP-DD modules from being inserted into legacy SFP+ cage 20 and connector, which will potentially damage the customer system. In an aspect of the disclosure, the keying configuration allows legacy SFP module to work with SFP-DD connector and cage.

In an embodiment, the cage housing 26 further has an upper bezel gasket 78 which is attached to the top wall 28 and to the cap 64 proximate to the mating end 42 of the cage housing 26, a first side wall bezel gasket 80 which is attached to the first side wall 30 proximate to the mating end 42 of the cage housing 26, a second side wall bezel gasket 82 which is attached to the second side wall 32 proximate to the mating end 42 of the cage housing 26, and a lower bezel gasket 84 which is attached to the bottom wall 34 proximate to the mating end 42 of the cage housing 26.

The upper bezel gasket 78 has a plurality of deflectable spring fingers 86, 88, 90, 92, 94, 96, 98 which have front ends that are connected to each other at a bridge 100. The upper bezel gasket 78 may be formed of spring tempered material. The bridge 100 is mounted to the cage housing 26 by suitable means, such as welding, proximate to the mating end 42 thereof. Spring fingers 86, 88, 90, 98 are proximate to the top wall 28 of the cage housing 26 and extends along a portion of the length of the top wall 28. Spring finger 92 is proximate to the first side wall 70 of the cap 64 and extends along a portion of the length of the first side wall spring finger 94 is proximate to the upper wall 76 of the cap 64 and extends along a portion of the length of the upper wall 76, and spring finger 96 is proximate to the second side wall 72 of the cap 64 and extends along a portion of the length of the second side wall 72. While four spring fingers 86, 88, 90, 98 are shown on the top wall 28, this is merely an example and more or less than four spring fingers may be provided. In addition, while three spring fingers 86, 88, are shown on one side of the cap 64 and one spring finger 98 is shown on the other side of the cap 64, more or less than spring fingers may be provided on either side of the cap 64. Furthermore, more than one spring finger 92, 94, 96 may be provided on each wall 70, 72, 74 of the cap 64.

Each of the side and lower bezel gaskets 80, 82, 84 has a plurality of deflectable spring fingers 102 which have front ends that are connected to each other at a bridge 104. Each bezel gasket 80, 82, 84 may be formed of spring tempered material. The bridge 104 is mounted to the cage housing 26 by suitable means, such as welding, proximate to the mating end 42 thereof. Each spring finger 102 extends along a portion of the length of the respective wall 30, 32, 34. While the side and lower bezel gaskets 80, 82, 84 are shown as a single member, the side and lower bezel gaskets 80, 82, 84 can be individually formed and attached to the cage housing 26.

As described herein, the cap 64 is integrally formed with the top wall 28, however, in an embodiment, the cap 64 is separately formed from the cage housing 26 and the top wall 28 has an elongated slot (not shown) formed therethrough over which the cap 64 is positioned; the cap 64 being permanently attached to the top wall 28, for example by welding so that, in effect, the cap 64 becomes integral with the cage housing 26. In this embodiment, the spring fingers 86, 88, 90, 98 seated on the top wall 28 of the cage housing 26 may be integrally formed with the separately formed cap 64 and affixed to the top wall 28 with the separately formed cap 64. While the spring fingers 92, 94, 96 on the cap 64 are described as being integrally formed with the spring fingers 86, 88, 90, 98 seated on the top wall 28, the spring fingers 92, 94, 96 on the cap 64 can be separately formed from the spring fingers 86, 88, 90, 98 seated on the top wall 28 and separately attached to the cap 64.

In an embodiment, each spring finger 86-98 and 102 is folded over an edge creating a 182-degree formed edge. Although excessive material is used in this method, an advantage is gained by providing a lead-in for the projection 66 formed on the plug connector 22. In an alternative construction, the spring fingers 86-98 and 102 are formed as separate pieces that are fixed, usually by welding, to the cage housing 26.

Figure 10:
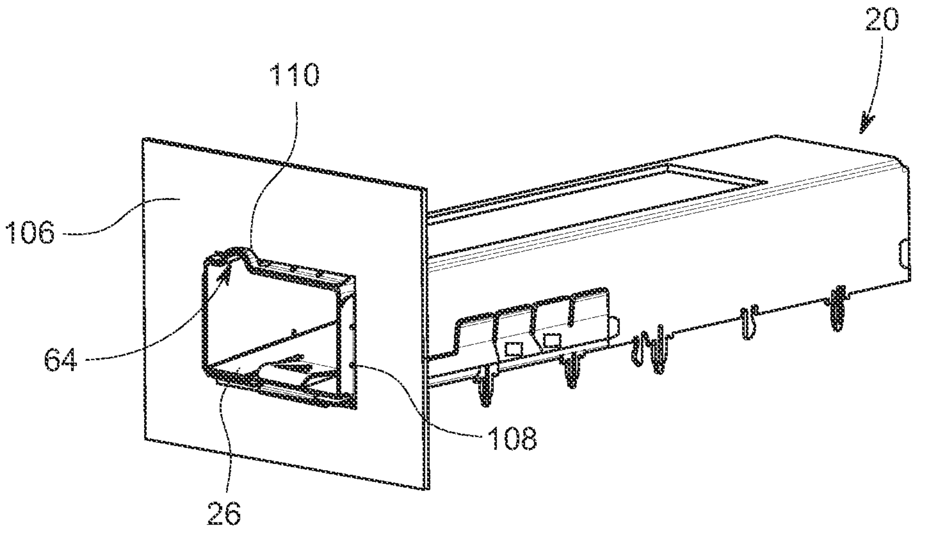
FIG. 10 is a perspective view of an embodiment of a bezel having the cage mounted therein.
Figure 11:
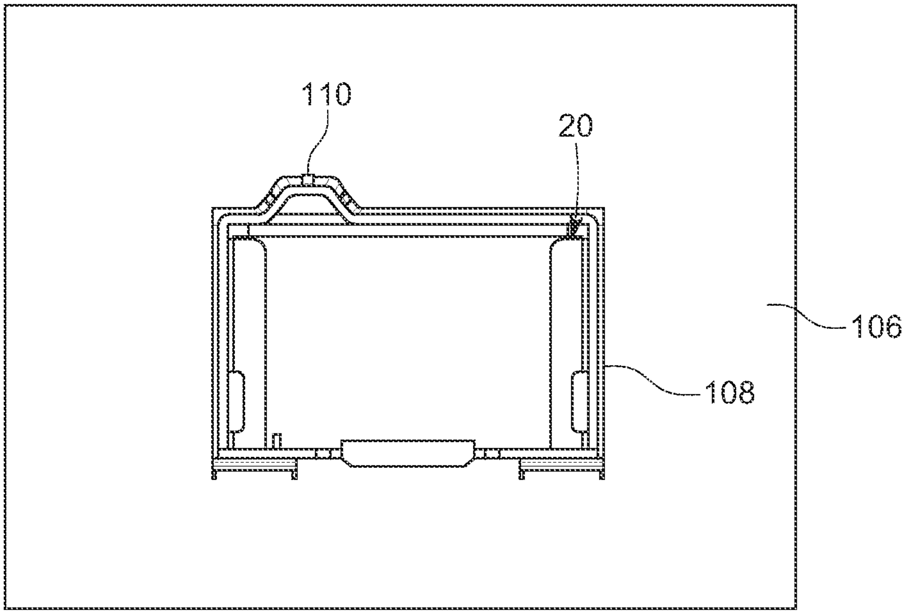
FIG. 11 is a front elevation view of the bezel and the cage.

In an embodiment as shown in FIGS. 10 and 11, the cage 20 is mounted to a conductive bezel 106. The bezel 106 has an I/O port aperture 108 which mirrors the shape of the cage housing 26 of the cage 20 and a cutout 110 which mirrors the shape of the cap 64. The cutout 110 is open to the aperture 108 such that the aperture 108 and the cutout 110 are in communication with each other. To ensure proper fit, a gap is maintained around the profile of the cap 64 and the exterior periphery of the walls 28, 30, 32, 34 of the cage 20, thereby providing clearance between the cage 20 and the bezel 106. The spring fingers 86, 88, 90, 102 engage and are compressed by an edge of the aperture 108 of the bezel 106 to provide additional sealing, and the spring fingers 92, 94, 96 engage and are compressed by an edge of the cutout 110 of the bezel 106 to provide additional sealing. The gap created from the cutout 110 in the bezel 106 is generally normal to the insertion direction of the cage 20 into the bezel 106, such that when the spring fingers 86-98 and 102 are deflected, an efficient seal is created between the cage 20 and the bezel 106.

Figure 12:
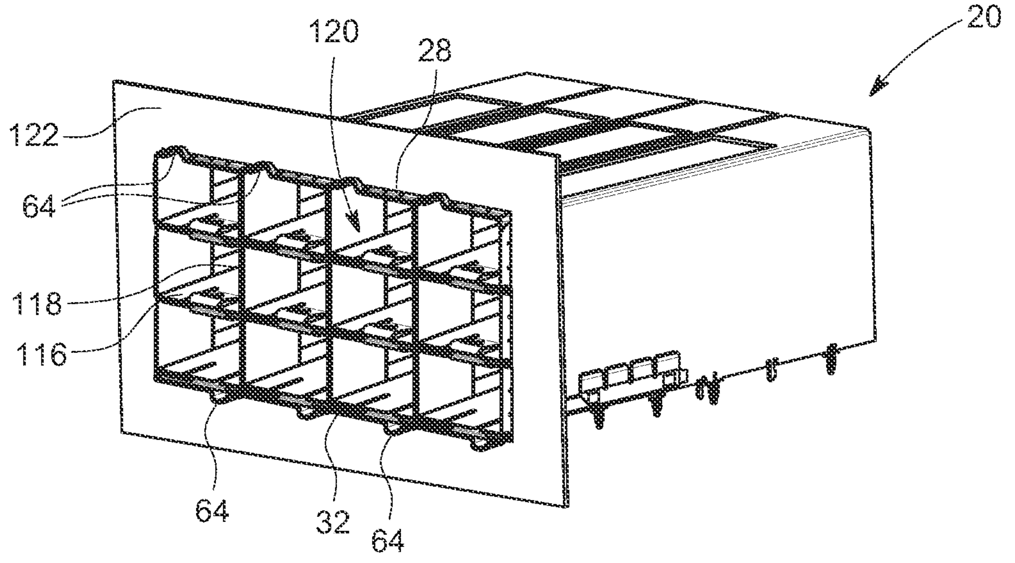
FIG. 12 is a perspective view of another embodiment of a bezel having an embodiment of the cage mounted therein.
Figure 13:
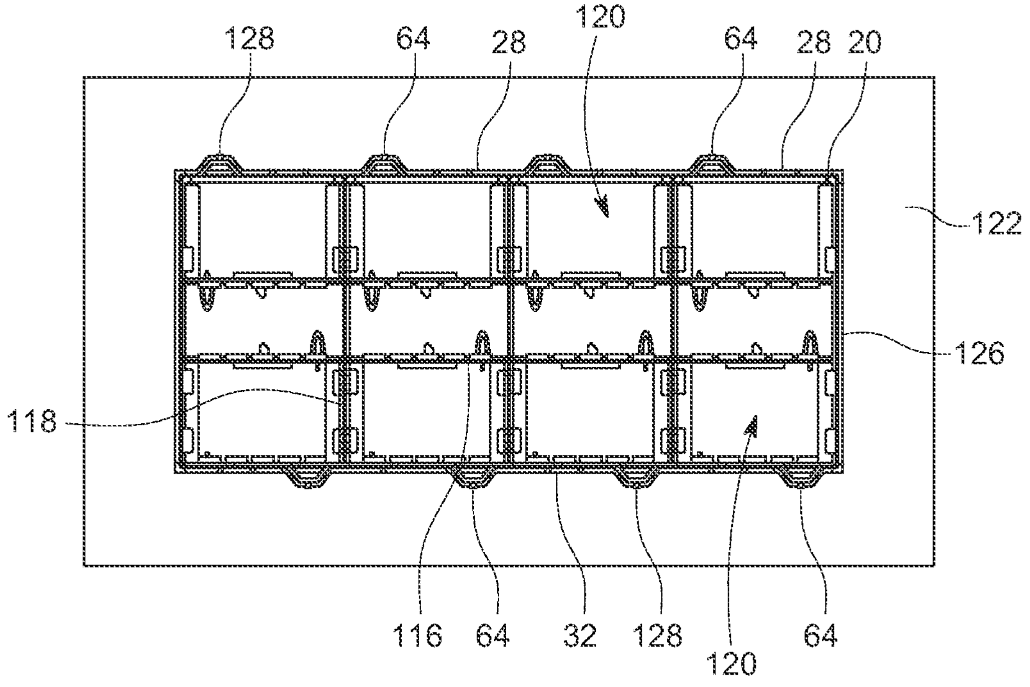
FIG. 13 is a front elevation view of the bezel and the cage shown in FIG. 12.

In an embodiment as shown in FIGS. 12 and 13, the cage 20 has a plurality of inner walls 116, 118 which separate the inner area 36 into a plurality of bays 120 into which plug connectors 22 can be inserted into each bay 120. As shown, the top wall 28 has a plurality of the caps 64 forming keyways 68 open to respective bays 120 and associated spring fingers 86-98 thereon, the caps 64 being spaced apart from each other, and the bottom wall 34 has a plurality of the caps 64 forming keyways 68 open to the respective bays 120 and associated spring fingers 86-98 thereon, the caps 64 being spaced apart from each other. The caps 64 on the bottom wall 34 are identically formed to the caps 64 on the top wall 28 except that the side walls 70, 72 extend downwardly from the bottom wall 34 and the wall 76 forms a lower wall of each cap 64. The cage 20 is mounted to a conductive bezel 122. The bezel 122 has an I/O port aperture 126 which mirrors the shape of the cage housing 26 of the cage 20 and a plurality of cutouts 128 which mirrors the shape of the respective caps 64. Each bay 120 has an associated cutout 128. To ensure proper fit, a gap is maintained around the profile of the caps 64 and the exterior periphery of the walls 28, 30, 32, 34 of the cage 20, thereby providing clearance between the cage 20 and the bezel 122. The spring fingers 86, 88, 90, 102 engage and are compressed by an edge of the aperture 126 of the bezel 122 to provide additional sealing, and the spring fingers 92, 94, 96 engage and are compressed by an edge of the respective cutouts 128 of the bezel 122 to provide additional sealing. The gaps created from the cutouts 128 in the bezel 122 are generally normal to the insertion direction of the cage 20 into the bezel 122, such that when the spring fingers 86-98 and 102 are deflected, an efficient seal is created between the cage 20 and the bezel 122. Typically, the bays 120 in this arrangement are positioned in a belly-to-belly orientation, but can also be arranged in a stacked vertically aligned arrangement. Multiple row arrangements may also be positioned longitudinally creating a linear array. In a sense, arrangements follow a "M×N" orientation where M is the stacked number of bays and N is the number of columns of stacked bays. In a ganged arrangement, the bezel gaskets 78, 80, 82, 84 provide EMI sealing for all of the bays 120 along the longitudinal direction.

The conductive cage 20 provides a grounding seal between the conductive bezel 106, 120 and plug connector 22. This provides a low impedance and low leakage seal that provides a ground path to the bezel 106, 122, and provides sealing the I/O port aperture 108, 126 allowing the plug connector 22 to be plugged into the installed cage 20.

Additional EMI shielding can be employed around openings at corners and edges that may not be completely sealed. In these instances, a compliant or elastomeric material that is formed with electrically conductive properties can be placed in areas of leakage. These secondary gaskets can include conductive foam, pliable wire braid, fuzz buttons and conductive whiskers or the like. These secondary gaskets are typically compressed during the assembly of the cage 20 to the bezel 106, 122, filling the void or clearance gap between the cage 20 and the bezel 106, 122, and also between the cage 20 and the spring fingers 92, 94, 96 on the cap 64 to further seal any gaps. It is also contemplated that a dispensed conductive material can be applied in the gaps after the mating of the cage 20 and the bezel 106, 122, such as an air curable expandable conductive material or foam. In all sealing structures, the material positioned in or near the gap between the cage 20 and the bezel 106, 122 must be resilient and maintain elasticity to prevent intermittent electrical connection due to vibration and wear during insertion and withdrawal of the plug connector 22 from the cage 20.

Inclusion of both the keyway 68 with the enhanced grounding features provided by the spring fingers and bezel 106, 122, as well as a substantially contiguous ground to the bezel 106, 120, is capable of maintaining EMI containment as well as providing plug connector 22 to cage 20 keying identification.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

We claim:

1. An assembly, comprising:

a plurality of plug connectors, each of the plug connectors having a raised projection extending from a top wall of a housing of a respective one of the plug connectors; and a cage formed of a conductive material, the cage having a mating end and an opposite end, the cage comprising:

a cage housing comprising a top wall, a bottom wall, and side walls connecting the top wall and the bottom wall together defining a plurality of bays configured to receive the respective one of the plug connectors, the walls forming an inner area extending from the mating end of the cage to the opposite end adapted to receive the raised projection of the respective one of the plug connectors, the top wall comprising a cut-out portion; and a cap being on the top wall of the cage housing, the cap having an end wall, angled side walls extending upwardly from the top wall, and an upper wall at ends of the angled side walls of the cap and spaced from the top wall, the angled side walls and the upper wall of the cap forming a keyway in communication with the inner area, wherein the keyway extends from the mating end of the cage along a portion of a length of the cage housing between a front of the cage housing and the cut-out portion such that the end wall of the cap is spaced from a rear end of the cage housing.

2. The assembly according to claim 1, wherein each of the plug connectors further comprises a paddle card positioned between a top wall and a bottom wall of the respective one of the plug connectors.

3. The assembly according to claim 2, wherein the paddle card is offset toward the bottom wall, extends forward of a front face of the respective one of the plug connectors, and the paddle card comprises two rows of contact pads positioned adjacent each other along a mating direction.

4. The assembly according to claim 1, wherein the cut-out portion is a rectangular-shaped cut-out portion that is in communication with the inner area.

5. An input/output (I/O) connector, comprising:

a cage formed of a conductive material that is configured to receive a plug connector, the cage having a mating end and an opposite end, the cage comprising:

a cage housing comprising a top wall, a bottom wall, and side walls connecting the top wall and the bottom wall together, the walls forming an inner area extending from the mating end of the cage to the opposite end adapted to receive a projection of the plug connector; and a cap being on the top wall of the cage housing, the cap having an end wall, angled side walls extending upwardly from the top wall, and an upper wall at ends of the angled side walls of the cap and spaced from the top wall, the angled side walls and the upper wall of the cap forming a keyway in communication with the inner area, wherein the keyway extends from the mating end of the cage along a portion of a length of the cage housing such that the end wall of the cap is spaced from a rear end of the cage housing.

6. The connector of claim 5, wherein the cap is integrally formed with the cage housing.

7. The connector of claim 5, wherein each of the end wall, angled side walls, and the top wall is flat.

8. The connector of claim 5, wherein the top wall has a midpoint, and the cap is positioned on the top wall of the cage housing laterally to one side of the midpoint.

9. The connector of claim 5, wherein the cap is a first cap, the keyway is a first keyway, the inner area is a first bay defined by an internal wall of the cage housing, and the internal wall further defines a second bay having a second inner area.

10. The connector of claim 9, further comprising:

a second cap being on the top wall of the cage housing, the second cap having an end wall, angled side walls extending upwardly from the top wall, and an upper wall at ends of the angled side walls of the second cap and spaced from the top wall, the angled side walls and the upper wall of the second cap forming a second keyway in communication with the second inner area, wherein the second keyway extends from the mating end of the cage along a portion of a length of the cage housing such that the end wall of the second cap is spaced from a rear end of the cage housing.

11. The connector of claim 5, further comprising a plurality of deflectable spring fingers extending from the top wall of the cage housing, a deflectable spring finger extending from each side wall of the cap and a deflectable spring finger extending from the upper wall of the cap.

12. The connector of claim 11, wherein each of the plurality of deflectable spring fingers is formed of spring tempered material.

13. The connector of claim 12, wherein predetermined ones of the plurality of deflectable spring fingers on the top wall are connected together by a bridge.

14. The connector of claim 12, wherein the plurality of deflectable spring fingers on the top wall and on the cap are connected together by a bridge.

15. The connector of claim 9, wherein the first bay is adapted to receive a first plug connector and the second bay is adapted to receive a second plug connector, the second plug connector being distinct and separate from the first plug connector.

16. A system, comprising:

a cage formed of a conductive material, the cage having a mating end and an opposite end, the cage comprising:

a cage housing comprising a top wall, a bottom wall, and side walls connecting the top wall and the bottom wall together defining a plurality of bays each configured to receive a plug connector, the walls forming an inner area extending from the mating end of the cage to the opposite end adapted to receive a raised projection of the plug connector, the top wall comprising a cut-out region; and a cap defined by and integral with the top wall of the cage housing, the cap having an end wall, angled side walls extending upwardly from the top wall, and an upper wall at ends of the angled side walls of the cap and spaced from the top wall, the angled side walls and the upper wall of the cap forming a keyway in communication with the inner area, wherein the keyway extends from the mating end of the cage along a portion of a length of the cage housing between a front of the cage housing and the cut-out region such that the end wall of the cap is spaced from a rear end of the cage housing.

17. The system according to claim 16, further comprising the plug connector, the plug connector being one of a plurality of plug connectors, each of the plug connectors having a raised projection extending from a top wall of a housing of a respective one of the plug connectors.

18. The system according to claim 17, wherein:

each of the plug connectors further comprises a paddle card positioned between a top wall and a bottom wall of the respective one of the plug connectors; and the paddle card is offset toward the bottom wall, extends forward of a front face of the respective one of the plug connectors, and comprises two rows of contact pads positioned adjacent each other along a mating direction.

19. The system according to claim 18, further comprising a mating connector having a plurality of wafers arranged in a side-by-side arrangement and supported by an insulative frame, the insulative frame of the mating connector being shaped to seat within the inner area of the cage such that the plug connector can mate with the mating connector within the cage.

20. The system according to claim 19, wherein the wafers comprise two rows of terminals spaced along the mating direction each of which being configured to engage respective contact pads of the paddle card.

* * * * *